United States Patent
Cimbura, Sr.

(10) Patent No.: US 6,371,487 B1
(45) Date of Patent: Apr. 16, 2002

(54) GIMBAL AND SEAL FOR THE DRIVEHEAD OF A DOWNHOLE ROTARY PUMP

(75) Inventor: John A. Cimbura, Sr., Ventura, CA (US)

(73) Assignee: Kudu Industries, Inc. (CA)

( * ) Notice: Subject to any disclaimer, the term of this patent is extended or adjusted under 35 U.S.C. 154(b) by 0 days.

(21) Appl. No.: 09/433,687

(22) Filed: Nov. 4, 1999

(30) Foreign Application Priority Data

Nov. 3, 1999 (CA) .............................................. 2288479

(51) Int. Cl.$^7$ ........................... F16J 15/18; E21B 33/03
(52) U.S. Cl. ....................................... 277/322; 277/329
(58) Field of Search ................................ 277/322, 323, 277/328, 329, 330

(56) References Cited

U.S. PATENT DOCUMENTS

| | | |
|---|---|---|
| 3,554,466 A | 1/1971 | Paine et al. |
| 3,887,196 A | 6/1975 | Renfrow |
| 3,891,031 A | 6/1975 | Ortiz |
| 3,967,841 A | 7/1976 | Kendrick et al. |
| 4,030,546 A | 6/1977 | Rogers et al. |
| 4,314,611 A | 2/1982 | Willis |
| 4,320,799 A * | 3/1982 | Gilbertson |
| 4,345,766 A | 8/1982 | Turanyi |
| 4,353,558 A | 10/1982 | Firth |
| 4,372,379 A | 2/1983 | Kulhanek et al. |
| 4,381,867 A | 5/1983 | Ohgoshi |
| 4,480,685 A | 11/1984 | Gilbertson |
| 4,643,463 A | 2/1987 | Halling et al. |
| 4,732,396 A | 3/1988 | Brigham et al. |
| 4,773,654 A | 9/1988 | Fritsch |
| 4,811,798 A * | 3/1989 | Falgout, Sr. et al. |
| 4,848,775 A | 7/1989 | Lough |
| 5,050,895 A | 9/1991 | Hashish et al. |
| 5,139,090 A | 8/1992 | Land |
| 5,244,183 A | 9/1993 | Calvin et al. |
| 5,327,961 A | 7/1994 | Mills |
| 5,333,883 A | 8/1994 | Piper et al. |
| 5,343,944 A | 9/1994 | Bassinger |
| 5,346,004 A | 9/1994 | Borden et al. |
| 5,368,311 A | 11/1994 | Heyl |
| 5,395,183 A * | 3/1995 | Watkins |
| 5,398,944 A | 3/1995 | D'Alfonso et al. |
| 5,411,298 A | 5/1995 | Pollack |
| 5,429,188 A | 7/1995 | Cameron et al. |
| 5,456,160 A | 10/1995 | Caldwell |
| 5,493,954 A | 2/1996 | Kostohris et al. |
| 5,538,080 A | 7/1996 | Bassinger |
| 5,577,737 A | 11/1996 | Lacy |
| 5,628,516 A | 5/1997 | Grenke |
| 5,636,688 A | 6/1997 | Bassinger |
| 5,639,227 A | 6/1997 | Mills |
| 5,653,290 A | 8/1997 | Bland |
| 5,697,768 A | 12/1997 | Mills |
| 5,727,445 A | 3/1998 | Sheldon |
| 5,732,777 A | 3/1998 | Grimshaw et al. |
| 5,749,416 A | 5/1998 | Belcher |
| 5,752,814 A | 5/1998 | Starks et al. |
| 5,755,372 A | 5/1998 | Cimbura |

FOREIGN PATENT DOCUMENTS

CA           2162311       12/1998

* cited by examiner

Primary Examiner—Anthony Knight
Assistant Examiner—John L. Beres
(74) Attorney, Agent, or Firm—Pendorf & Cutliff

(57) ABSTRACT

The invention relates to downhole rotary pumping arrangements and more particularly to drivehead gimbals and seals used in the driveheads of downhole rotary pumps. The gimbal and seal system described enables the wobble of a rotating shaft to be absorbed without compromising the seal around the shaft.

13 Claims, 2 Drawing Sheets

GIMBAL AND SEAL FOR THE DRIVEHEAD OF A DOWNHOLE ROTARY PUMP

FIELD OF THE INVENTION

The invention relates to downhole rotary pumping arrangements and more particularly to drivehead gimbals and seals used in the driveheads of downhole rotary pumps. The gimbal and seal system described enables the wobble of a rotating shaft to be absorbed without compromising the seal around the shaft.

BACKGROUND OF THE INVENTION

Downhole rotary pumps, such as progressing cavity pumps, are used for the conveying of different types of fluids, but are especially well suited for the pumping of very viscous or thick liquids such as crude oil laden with sand. A downhole rotary pump is operated by a drive string, generally consisting of a rod or tube string that extends down the well bore. The drive string rotates in a stationary production tubing and is suspended from and rotated by a drivehead assembly which is associated with the wellhead. The drivehead assembly is generally mounted to the top of a wellhead which is attached to the top end of the production tubing. A polished rod is attached to the upper end of the drive string and extends through the drivehead to facilitate sealing around the drive string and backwashing of the pump. The pump includes a stator connected to the bottom end of the production tubing and a rotor attached to the bottom end of the drive string. Upon actuation of the pump by rotation of the drive string, the pumped liquid is forced to the ground surface through the annular space provided between the drive string and the production tubing.

In conventional downhole rotary pump driveheads, a stuffing box is used to seal the annular space between the tubing and the drive string in the drivehead and above the pumped liquid take-off valve of the wellhead. The stuffing box is generally mounted in a bottom end of the drivehead to tightly seal around the rotating polished rod. In order to reduce wear of the polished rod and stuffing box components and to provide adequate lubrication and cooling of the polished rod/stuffing box interface, the fit of the stuffing box around the string must be adjusted such that a controlled leakage of about 2 to 3 drops of pumped liquid per minute is achieved. This constant leakage, although at a relatively low rate, can result in the accumulation of significant amounts of spilled liquid over long periods of operation. Recently, political pressure by environmental groups and the enactment of laws in many jurisdictions which require "clean" wellheads, have forced well operators to reduce the stuffing box leakage rate. However, the resulting lesser lubrication causes considerably higher stuffing box and polished rod wear. Furthermore, wobble of the polished rod, which is especially prevalent with Moineau type pumps must be compensated by the stuffing box if a reliable seal is to be achieved, places additional stress on the sealing material respectively used. Thus, a reliable and durable seal is desired, which will not allow unacceptable leakage as described in Canadian Patent 2,162,311 issued Dec. 22, 1998 and U.S. Pat. No. 5,639,227 and incorporated herein by reference.

However, as a further improvement on the seal, and in order to further compensate for the wobble of a rotating shaft, there has been a need for seal system incorporating a gimbal and seal system.

SUMMARY OF THE INVENTION

In accordance with the invention, a seal and gimbal system for use in a drivehead of a downhole rotary pump is provided, which pump is operated by a drive string suspended from the drivehead for rotation in a production tubing about a longitudinal axis, the drivehead having a bore in fluid communication and coaxial with the production tubing and sized to permit the passage of a polished rod attached to a top end of the drive string, the seal and gimbal system for sealing an annular space between the production tubing and polished rod from the drivehead, the seal and gimbal system comprising:

a top seal assembly fixed to the polished rod and rotatable with the polished rod, the top seal assembly also for providing a seal between the annular space and drivehead;

a gimbal assembly operatively connected to the top seal assembly and rotatable with the top seal assembly, the gimbal assembly having first and second portions enabling pivotal displacement of the first and second portions with respect to one another during rotation of the polished rod and a gimbal seal between the first and second portions;

a bearing assembly operatively connected to the gimbal assembly enabling rotation of the gimbal assembly and the polished rod with respect to the drivehead;

a bottom seal assembly operatively connected to the bearing assembly for providing a seal between the drivehead and annular space.

In further embodiments, the first portion includes an inner spherical member having a convex and spherical outer surface and the second portion includes a base member having a concave semi-spherical inner surface engageable with a retaining ring having a concave semi-spherical inner surface, the gimbal seal includes at least one o-ring seated between the first and second portions, and/or the bottom seal assembly includes an inner sleeve radial to the polished rod and at least one rotating seal selected from any one or a combination of a pressure seal, mechanical seal, debris exclusion seal and labyrinth seal between the rotating inner sleeve and drivehead.

In a further embodiment, the system also includes a bushing within the drivehead for stabilizing the polished rod.

In a more specific embodiment, the seal and gimbal system comprises:

a top seal assembly fixed to the polished rod and rotatable with the polished rod, the top seal assembly also for providing a seal between the annular space and drivehead, the top seal assembly including a seal mounting ring and top ring for retaining a seal;

a gimbal assembly operatively connected to the top seal assembly and rotatable with the top seal assembly, the gimbal assembly having first and second portions enabling pivotal displacement of the first and second portions with respect to one another during rotation of the polished rod and a gimbal seal between the first and second portions wherein the first portion includes an inner spherical member having a convex and spherical outer surface and the second portion includes a base member having a concave semi-spherical inner surface engageable with a retaining ring having a concave semi-spherical inner surface and the gimbal seal includes at least one o-ring seated between the first and second portions;

a bearing assembly operatively connected to the gimbal assembly enabling rotation of the polished rod with respect to the drivehead;

a bottom seal assembly operatively connected to the bearing assembly for providing a seal between the drivehead and annular space wherein the bottom seal assembly includes an inner sleeve radial to the polished rod and at least one seal selected from any one or a combination of a pressure seal, mechanical seal debris exclusion seal and labyrinth seal between the inner sleeve and drivehead.

BRIEF DESCRIPTION OF THE DRAWINGS

The invention will now be further described by way of example only and with reference to the attached drawings, wherein.

DETAILED DESCRIPTION OF THE PREFERRED EMBODIMENT

Figure 1:
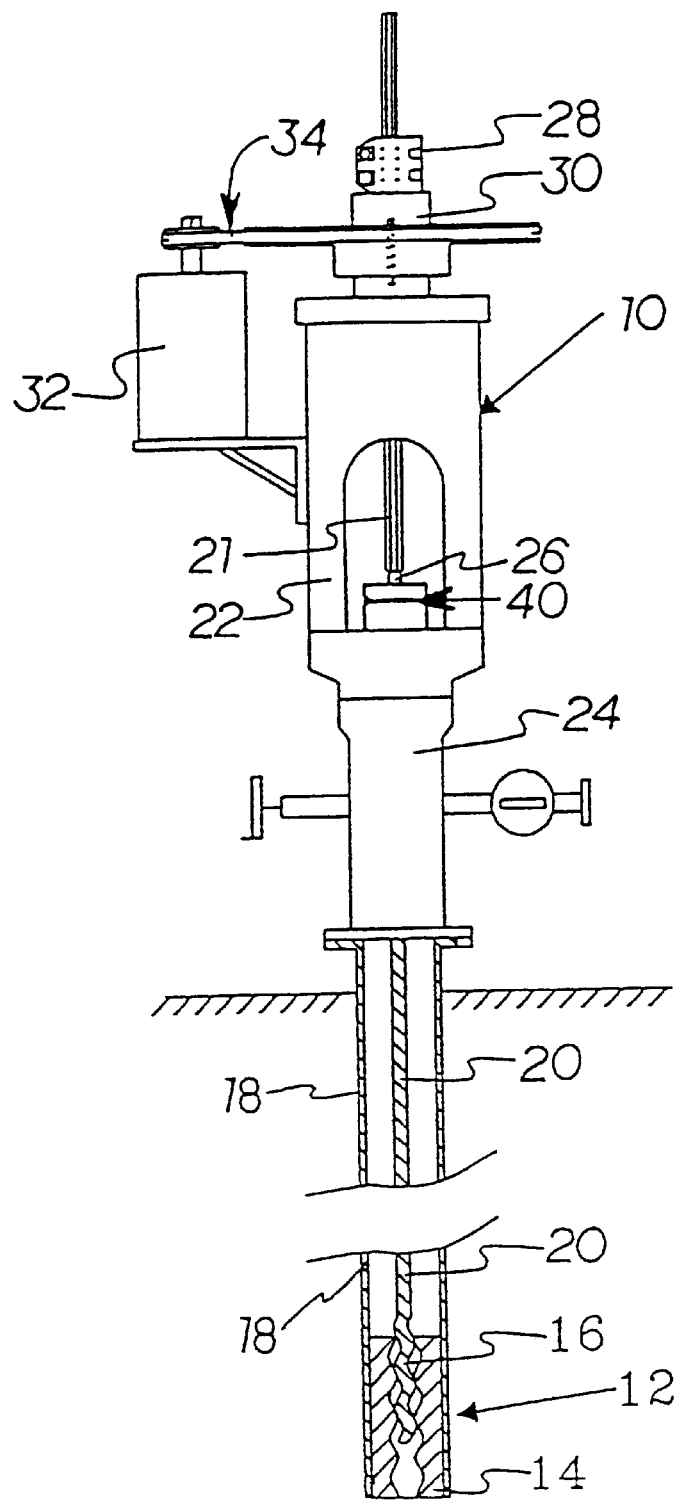
FIG. 1 is a schematic side elevational view of a rotary downhole pump arrangement which is operated by a drivehead including a gimbal and seal arrangement in accordance with the invention; and, FIG. 2 is an axial cross-section through a preferred embodiment of a gimbal and seal arrangement in accordance with the invention.

Leakproof seal arrangements in accordance with the invention are intended for use in a downhole rotary pump assembly as shown in FIG. 1 and especially in the drivehead 10 thereof which is used for the operation of a progressing cavity downhole pump 12 including a stator 14 and a rotor 16. The stator 14 is connected to the bottom end of a production tubing 18 and the rotor 16 is mounted to the bottom end of a drive string 20 which is suspended from the drivehead 10 and generally consists of a plurality of connected sucker rods or tubes (not illustrated). The drivehead 10 includes a frame 22 which is concentrically screwed onto the top end of a conventional wellhead assembly 24 for downlole rotary pumps. The drive string 20 includes a polished rod 26 which is affixed to a top end of the sucker rod or tube string and extends through a bore in the drivehead frame 22 as will be described below in detail with reference to FIG. 2. The drive string 20 is suspended from the drivehead 10 by way of a clamp 28 which is shaped to accommodate an end of the polished rod 26 that protrudes upward from a drive spindle 30 of the drivehead 10. The clamp 28 is fastened to the drive string above the drivehead and rests on a top surface of the drive spindle 30. A slip shaft 21, preferably of hexagonal cross-section (available from KUDU Industries, Calgary, Canada) may be attached to the top end of the polished rod 26 to permit adjustment of the axial position of the drive string 20 in the tubing 18 and the drive spindle 30, while ensuring the reliable, slip-free transmission of torque to the drive string. In that case, the clamp 28 is mounted on the slip shaft. Torque from an electric motor 32 is transmitted to the drivehead 10 and the drive string 20 by way of a conventional V-belt and pulley arrangement 34 well known to persons of skill in the art of rotary downhole pumping arrangements. Alternatively, the drive spindle 30 may be driven by a right-angle gear drive powered by an internal combustion engine (not illustrated), or a comparable power source, in a manner well known in the art. Leakage of the pumped fluid, which is conveyed in the annular space between the production tubing and the drive string, is substantially prevented by a seal arrangement 40 in accordance with the invention which is incorporated into the drivehead 10.

Figure 2:
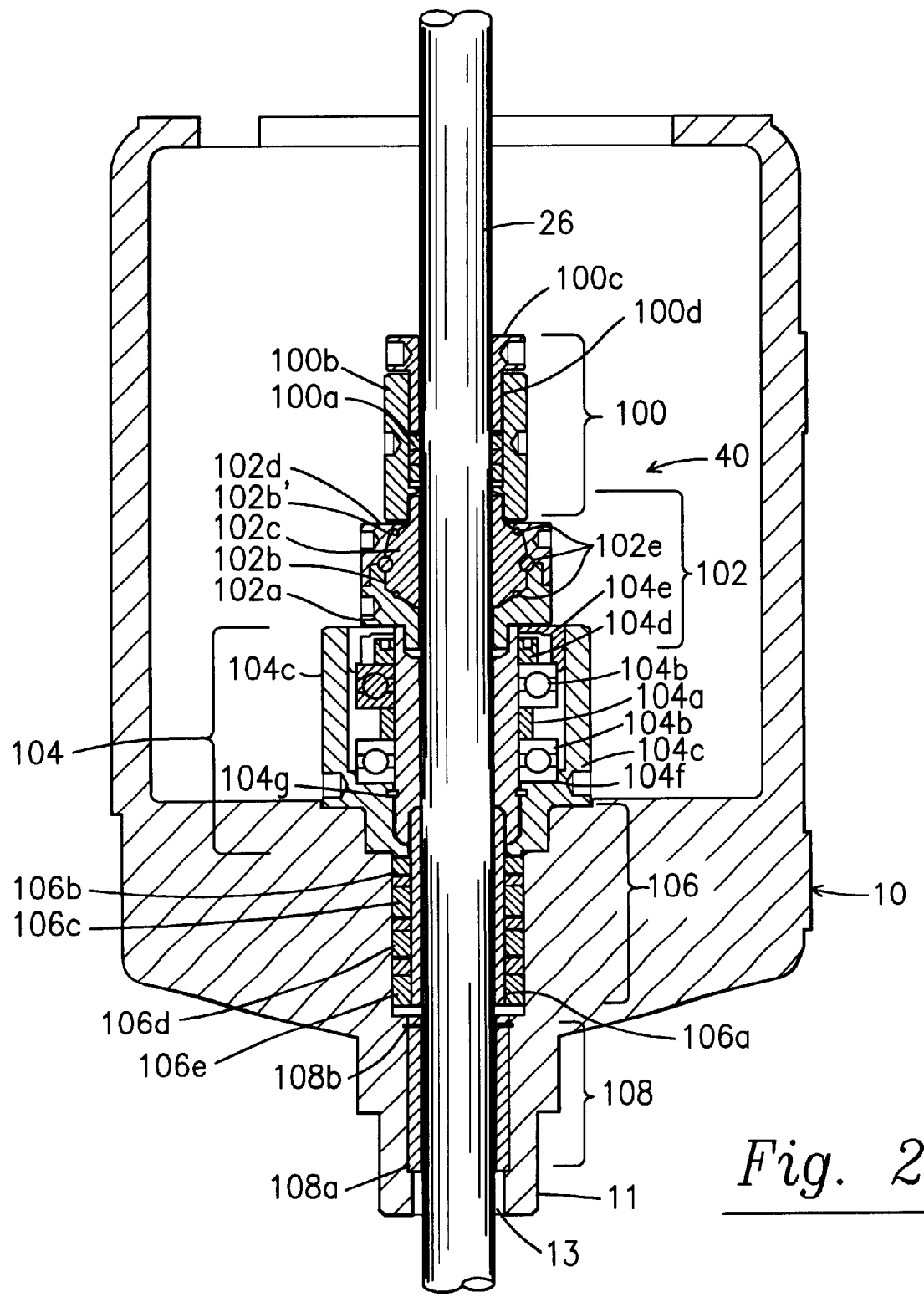

The preferred embodiment of a gimbal and seal arrangement in accordance with the invention as shown in FIG. 2 is intended for use with a drivehead 10 having a threaded pin connection 11, or another suitable connection known in the art, for attachment to the top end of a wellhead 24 (see FIG. 1). The drivehead has a central bore 13 in fluid connection and coaxial with the production tubing 18 (see FIG. 1).

The gimbal and seal assembly 40 includes a top seal assembly 100, a gimbal assembly 102, a bearing assembly 104, lower seal assembly 106 and stabilizing assembly 108. Generally, the top seal assembly provides pack-off seal at the top of the polished rod 26, the gimbal assembly allows wobble motion for the rotating polished rod to be absorbed, the bearing assembly 104 allows the polished rod, gimbal and lower inner sleeve to rotate with respect to the drivehead 10, the lower seal assembly 106 provides a stationary seal between the drivehead 10 and rotating lower inner seal sleeve 106a and the stabilizer assembly 108 provides a stable bushing for the polished rod within the drivehead 10.

With respect to the stabilizing assembly 108, a bushing 108a is seated within the drivehead 10 through which the polished rod 26 passes in order to provide radial stability to the rod 26 rotating with respect to the bushing 108a. A retaining clip 108b holds the bushing 108a in place.

The bronze bushing 108a provides a measure of stabilization for the polished rod 26. However, this stabilization is not sufficient to protect the upper seals and bearings because a clearance of 10–20 mm on the radius of the bushing 108a must be provided to accommodate the variation in diameters of polished rods and to allow polished rods to be easily insertable into the assembly. In addition, the bushing becomes a pivot point for polished rod wobble and thus it may cause premature wear of both the polished rod and bushing.

The inner seal sleeve 106a and inner bearing sleeve 104a must also have sufficient clearance that the polished rod will not come into contact with them due to wobble. This is necessary to prevent the bearings 104b from being overloaded.

Polished rod wobble makes it difficult to maintain a seal around the polished rod at the rotating seal in rotating seal assemblies 9 for example, (the seal assembly 100) because of the amount of cyclical deformation. The gimbal assembly 102 allows the seals 100a to wobble with the polished rod so that there is no cyclic deformation of the seals 100a.

The bearing assembly 104 includes an inner bearing sleeve 104a fixed to roller bearings 104b seated within an outer bearing sleeve 104c seated within drivehead 10. The roller bearings 104b are retained between the inner and outer bearing sleeves by inner bearing screw ring 104d, outer bearing screw ring 104e and bearing seat 104f on outer bearing sleeve 104c. A grease seal 104g retains bearing grease within the bearing assembly 104.

The lower seal assembly 106 includes a lower inner rotating seal sleeve 106a connected to the inner bearing inner sleeve 104a and recessed within the drivehead 10. A plurality of seals including a single lip pressure activated seal 106b, double lip pressure activated seals 106c, sand exclusion seal 106d and labyrinth seal 106e are located radially to the rotating lower inner seal sleeve 106a and abutting the drivehead 10. The seals are designed to prevent leakage from the annular space 13 to the bearing assembly 104 from between the rotating lower inner seal sleeve 106a and drivehead 10.

The gimbal assembly 102 includes a base 102a having a semi-spherical inner surface 102b, a spherical gimbal member 102c seated against the inner surface 102b, a retaining ring 102d for connection to the base 102a and having a semi-spherical inner surface 102b' and appropriate sealing rings 102e seated within the base 102a and retaining ring 102*d* allows a pivoting motion of the gimbal member 102*c* with respect to the base 102*a* and retaining ring 102*d*. Sealing rings 102*e* prevent fluid from passing between the gimbal member 102*c* and the exterior of the gimbal assembly 102.

The top seal assembly 100 includes a pack-off seal 100*a* for gripping the polished rod 26 and for sealing the polished rod 26 between the annular space 13 and drivehead 10. The top seal assembly 100 includes a seal mounting ring 100*b* for connection to the gimbal member 102*c* and for retaining pack-off seal 100*a* between the seal mounting ring 100*b* and polished rod 26. The pack-off seal 100*a* is retained within the seal mounting ring 100*b* by top ring 100*c*, which may be tightened against seal 100*a* by threads 100*d*.

In operation, the pack-off seals 100*a* provide the primary seal between the annular space 13 and the drivehead 10. In addition, the top seal assembly 100 provides clamping between the polished rod 26 and the top seal assembly 100, the gimbal assembly 102, the bearing assembly 104 and the lower seal assembly 106, thereby allowing rotation of the top seal assembly 100, gimbal assembly 102, inner bearing sleeve 104*a* and lower inner seal sleeve 106*a* with the polished rod. As a result of the gimbal assembly 102, any wobble in the rotating polished rod is absorbed with sealing rings 102*e* preventing leakage at the gimbal assembly 102. Leakage through the bearing assembly 104 is prevented by the lower seal assembly 106.

Reliance upon the seals 100*a* to provide sufficient friction to rotate the gimbal assembly 100 and the inner bearing sleeve 104*a* and the lower inner seal sleeve 106*a* may be avoided by placing a clamp (not shown) on the polished rod 26 which engages the top ring 100*c* with, for example, a mating tongue and groove arrangement or dog clutch arrangement. This will have the additional advantage of keeping the top ring 100*c* in compression upon the seals 100*a*.

Changes and modifications in the specifically described embodiments can be carried out without departing from the scope of the invention which is intended to be limited only by the scope of the appended claims.

We claim:

1. A seal and gimbal system for use in a drivehead of a downhole rotary pump, which pump is operated by a drive string suspended from the drivehead for rotation in a production tubing about a longitudinal axis, the drivehead having a bore in fluid communication and coaxial with the production tubing and sized to permit the passage of a polished rod attached to a top end of the drive string, the seal and gimbal system for sealing an annular space between the production tubing and polished rod from the drivehead, comprising:

a top seal assembly fixed and sealed to the polished rod and rotatable with the polished rod;

a gimbal assembly operatively connected to the top seal assembly and rotatable with the top seal assembly, the gimbal assembly having first and second portions enabling pivotal displacement of the first and second portions with respect to one another during rotation of the polished rod and a gimbal seal between the first and second portions;

a bearing assembly operatively connected to the gimbal assembly enabling rotation of the gimbal assembly and the polished rod with respect to the drivehead; and, a lower seal assembly operatively connected to the bearing assembly for providing a seal between the bearing assembly and annular space.

2. A seal and gimbal system as in claim 1 wherein the first portion includes an inner spherical member having a convex and spherical outer surface and the second portion includes a base member having a concave semi-spherical inner surface engageable with a retaining ring having a concave semi-spherical inner surface.

3. A seal and gimbal system as in claim 1 wherein the gimbal seal includes at least one o-ring seated between the first and second portions.

4. A seal and gimbal system as in claim 1 wherein the lower seal assembly includes a rotating inner sleeve radial to the polished rod and at least one non-rotating seal selected from any one of or a combination of a pressure seal, debris exclusion seal and labyrinth seal between the inner sleeve and drivehead.

5. A seal and gimbal system as in claim 1 further comprising a bushing within the drivehead for stabilizing the polished rod.

6. A seal and gimbal system as in claim 1 wherein the bearing assembly includes a roller bearing.

7. A seal and gimbal system as in claim 2 wherein the gimbal seal includes at least one o-ring seated between the first and second portions.

8. A seal and gimbal system as in claim 7 wherein the lower seal assembly includes a rotating inner sleeve radial to the polished rod and at least one non-rotating seal selected from any one of or a combination of a pressure seal, debris exclusion seal and labyrinth seal between the inner sleeve and drivehead.

9. A seal and gimbal system as in claim 8 further comprising a bushing within the drivehead for stabilizing the polished rod.

10. A seal and gimbal system as in claim 9 wherein the bearing assembly includes a roller bearing.

11. A seal and gimbal system for use in a drivehead of a downhole rotary pump, which pump is operated by a drive string suspended from the drivehead for rotation in a production tubing about a longitudinal axis, the drivehead having a bore in fluid communication and coaxial with the production tubing and sized to permit the passage of a polished rod attached to a top end of the drive string, the seal and gimbal system for sealing an annular space between the production tubing and polished rod from the drivehead, comprising:

a top seal assembly fixed and sealed to the polished rod and rotatable with the polished rod, the top seal assembly including a seal mounting ring and top ring for retaining a seal;

a gimbal assembly operatively connected to the top seal assembly and rotatable with the top seal assembly, the gimbal assembly having first and second portions enabling pivotal displacement of the first and second portions with respect to one another during rotation of the polished rod and a gimbal seal between the first and second portions wherein the first portion includes an inner spherical member having a convex and spherical outer surface and the second portion includes a base member having a concave semispherical spherical inner surface engageable with a retaining ring having a concave semi-spherical inner surface and the gimbal seal includes at least one o-ring seated between the first and second portions;

a bearing assembly operatively connected to the gimbal assembly enabling rotation of the polished rod with respect to the drivehead;

a lower seal assembly operatively connected to the bearing assembly for providing a rotating seal between the bearing assembly and annular space wherein the lower seal assembly includes an inner sleeve radial to the polished rod and at least one non-rotating seal selected from any one of or a combination of a pressure seal, debris exclusion seal and labyrinth seal between the inner sleeve and drivehead.

12. A seal and gimbal system as in claim 1 wherein the clearance of the polished rod within the gimbal assembly is uniform to minimize lateral displacement of the polished rod within the gimbal assembly.

13. A seal and gimbal system as in claim 1 wherein the gimbal seal is for absorbing wobble in the polished rod.

* * * * *